United States Patent
Woodmansey et al.

(10) Patent No.: US 10,055,787 B2
(45) Date of Patent: Aug. 21, 2018

(54) SYSTEMS AND METHODS FOR LINKING ORDERS IN ELECTRONIC TRADING SYSTEMS

(75) Inventors: Robert J. Woodmansey, Doddinghurst (GB); Philip N. Ginsberg, New York, NY (US); Glenn D. Kirwin, Scarsdale, NY (US)

(73) Assignee: BGC PARTNERS, INC., New York, NY (US)

( * ) Notice: Subject to any disclaimer, the term of this patent is extended or adjusted under 35 U.S.C. 154(b) by 1057 days.

(21) Appl. No.: 12/909,728

(22) Filed: Oct. 21, 2010

(65) Prior Publication Data
US 2011/0040673 A1    Feb. 17, 2011

Related U.S. Application Data (63) Continuation of application No. 11/084,547, filed on Mar. 18, 2005, which is a continuation of application (Continued)

(51) Int. Cl.
*G06Q 40/04* (2012.01)
*G06Q 40/00* (2012.01)

(52) U.S. Cl.
CPC ............ *G06Q 40/04* (2013.01); *G06Q 40/00* (2013.01)

(58) Field of Classification Search
CPC ..................................................... G06Q 40/04
(Continued)

(56) References Cited

U.S. PATENT DOCUMENTS

| 3,573,747 A | 4/1971 | Adams et al. |
| 4,903,201 A | 2/1990 | Wagner |

(Continued)

FOREIGN PATENT DOCUMENTS

| EP | 0401203 | 12/1990 |
| EP | 0873549 | 10/1998 |

(Continued)

OTHER PUBLICATIONS

USPTO Office Action for U.S. Appl. No. 11/084,547, dated Nov. 22, 2010 (2 pages).
(Continued)

*Primary Examiner* — Lindsay M Maguire (57) ABSTRACT

Systems and methods for linking orders in electronic trading systems are provided. These systems and methods enable a trader to select two or more items that are to be linked and specify linking parameters for those items. Any desired set of items may be linked, and the linking parameters may include price adjustments, order sequencing instructions, automatic/manual execution controls, execution delays commands, and update frequency limits. Upon detecting a bid or offer for a linked item, the systems and methods may then determine a size and a price for each linked item based upon the size and the price of the bid or offer for the first linked item. In this way, the sizes and the prices for the other linked items may be propagated from the size and the price for the first item. Once the size and the price for each item is determined, the systems and methods may submit orders for the items in accordance with the linking parameters. In the case where orders for linked items may only be submitted in designated lot sizes, the systems and methods may round the sizes of the orders to the designated lot sizes, and then submit remainder orders to make up for the rounding.

20 Claims, 7 Drawing Sheets

Related U.S. Application Data

No. 09/627,705, filed on Jul. 28, 2000, now Pat. No. 7,155,410.

(60) Provisional application No. 60/146,971, filed on Aug. 3, 1999.

(58) Field of Classification Search
USPC .................................................... 705/35–45
See application file for complete search history.

(56) References Cited

U.S. PATENT DOCUMENTS

| | | |
|---|---|---|
| 5,038,284 A | 8/1991 | Kramer |
| 5,077,665 A | 12/1991 | Silverman et al. |
| 5,101,353 A | 3/1992 | Lupien et al. |
| 5,126,936 A | 6/1992 | Champion et al. |
| 5,161,103 A | 11/1992 | Kosaka et al. |
| 5,297,031 A | 3/1994 | Gutterman et al. |
| 5,500,793 A | 3/1996 | Deming, Jr. et al. |
| 5,689,652 A | 11/1997 | Lupien et al. |
| 5,717,989 A | 2/1998 | Tozzoli et al. |
| 5,727,165 A | 3/1998 | Ordish et al. |
| 5,787,402 A | 7/1998 | Potter et al. |
| 5,809,483 A | 9/1998 | Broka et al. |
| 5,845,266 A | 12/1998 | Lupien et al. |
| 5,857,176 A | 1/1999 | Ginsberg |
| 5,905,974 A | 5/1999 | Fraser et al. |
| 5,924,082 A | 7/1999 | Silverman et al. |
| 5,950,176 A | 9/1999 | Keiser et al. |
| 6,021,397 A | 2/2000 | Jones et al. |
| 6,035,287 A | 3/2000 | Stallaert et al. |
| 6,035,289 A | 3/2000 | Chou |
| 6,112,189 A | 8/2000 | Rickard et al. |
| 6,134,535 A | 10/2000 | Belzberg |
| 6,278,982 B1 | 8/2001 | Korhammer et al. |
| 6,304,858 B1 | 10/2001 | Mosler et al. |
| 6,321,212 B1 | 10/2001 | Lange |
| 6,343,278 B1 | 1/2002 | Jain et al. |
| 6,408,282 B1 | 6/2002 | Buist |
| 6,418,418 B1 | 7/2002 | Nakamura et al. |
| 6,418,419 B1 | 7/2002 | Nieboer et al. |
| 6,519,574 B1 | 2/2003 | Wilton et al. |
| 6,601,044 B1 | 7/2003 | Wallman |
| 6,839,685 B1 | 1/2005 | Leistensnider et al. |
| 6,947,901 B1 | 9/2005 | McCabe et al. |
| 6,953,843 B2 | 11/2005 | Takatsu et al. |
| 6,968,318 B1 | 11/2005 | Ferstenberg et al. |
| 6,996,539 B1 | 2/2006 | Wallman |
| 7,020,632 B1 | 3/2006 | Kohls et al. |
| 7,039,610 B2 | 5/2006 | Morano et al. |
| 7,092,919 B2 | 8/2006 | Bergenudd |
| 7,107,229 B1 | 9/2006 | Sullivan |
| 7,113,924 B2 | 9/2006 | Fishbain |
| 7,117,176 B2 | 10/2006 | Wallman |
| 7,155,410 B1 | 12/2006 | Woodmansey et al. |
| 7,333,952 B1 | 2/2008 | Neyman et al. |
| 7,383,220 B1 | 6/2008 | Keith |
| 7,451,105 B1 | 11/2008 | Doyle |
| 7,496,533 B1 | 2/2009 | Keith |
| 7,539,638 B1 | 5/2009 | Keith |
| 7,571,136 B2 | 8/2009 | May |
| 7,636,683 B1 | 12/2009 | Mills |
| 7,689,497 B2 | 3/2010 | May |
| 7,698,192 B2 | 4/2010 | Kiron et al. |
| 7,711,640 B2 | 5/2010 | Claus et al. |
| 7,711,644 B2 | 5/2010 | Claus et al. |
| 7,873,565 B2 | 1/2011 | Claus et al. |
| 7,921,056 B2 | 4/2011 | Claus et al. |
| 2001/0042040 A1 | 11/2001 | Keith |
| 2001/0042785 A1 | 11/2001 | Walker et al. |
| 2001/0044734 A1 | 11/2001 | Walker et al. |
| 2001/0044770 A1 | 11/2001 | Keith |
| 2001/0051909 A1 | 12/2001 | Keith |
| 2001/0056393 A1 | 12/2001 | Tilfors |
| 2002/0004776 A1 | 1/2002 | Gladstone |
| 2002/0013755 A1 | 1/2002 | Kiron et al. |
| 2002/0026399 A1 | 2/2002 | Narayan et al. |
| 2002/0065752 A1 | 5/2002 | Lewis |
| 2002/0091617 A1 | 7/2002 | Keith |
| 2002/0107781 A1 | 8/2002 | Neyman et al. |
| 2002/0107823 A1 | 8/2002 | Lefebvre et al. |
| 2002/0169703 A1 | 11/2002 | Lutnick et al. |
| 2002/0174047 A1 | 11/2002 | Fernholz |
| 2002/0178104 A1 | 11/2002 | Hausman |
| 2002/0188555 A1 | 12/2002 | Lawrence |
| 2003/0144944 A1 | 7/2003 | Kalt et al. |
| 2003/0154153 A1 | 8/2003 | Steidlmayer et al. |
| 2003/0212621 A1 | 11/2003 | Poulter et al. |
| 2004/0002913 A1 | 1/2004 | Breen et al. |
| 2004/0019553 A1 | 1/2004 | Setz et al. |
| 2004/0054563 A1 | 3/2004 | Douglas |
| 2004/0117285 A1 | 6/2004 | Kohler |
| 2004/0117302 A1 | 6/2004 | Weichert et al. |
| 2004/0143537 A1 | 7/2004 | Romani |
| 2004/0167847 A1 | 8/2004 | Nathan |
| 2004/0177026 A1 | 9/2004 | Balaban |
| 2004/0199451 A1 | 10/2004 | Benning et al. |
| 2004/0225593 A1 | 11/2004 | Frankel et al. |
| 2004/0236669 A1 | 11/2004 | Horst et al. |
| 2005/0049954 A1 | 3/2005 | Graham et al. |
| 2005/0075963 A1 | 4/2005 | Balaban |
| 2005/0160024 A1 | 7/2005 | Soderborg et al. |
| 2005/0165670 A1 | 7/2005 | Woodmansey et al. |
| 2006/0015436 A1 | 1/2006 | Burns et al. |
| 2006/0095360 A1 | 5/2006 | Apple |
| 2006/0161498 A1 | 7/2006 | Morano et al. |
| 2006/0195386 A1 | 8/2006 | Glodjo et al. |
| 2007/0106587 A1 | 5/2007 | Orloske et al. |
| 2007/0118457 A1 | 5/2007 | Peterffly et al. |
| 2007/0143203 A1 | 6/2007 | Claus et al. |
| 2007/0143204 A1 | 6/2007 | Claus et al. |
| 2008/0016010 A1 | 1/2008 | Nanjundamoorthy et al. |
| 2008/0255983 A1 | 10/2008 | von Corswant et al. |
| 2008/0306864 A1 | 12/2008 | Foley et al. |
| 2009/0276348 A1 | 11/2009 | Kessler et al. |
| 2010/0262528 A1 | 10/2010 | Claus et al. |
| 2010/0299239 A1 | 11/2010 | May |
| 2011/0060681 A1 | 3/2011 | Woodmansey et al. |
| 2011/0060682 A1 | 3/2011 | Woodmansey et al. |
| 2011/0066543 A1 | 3/2011 | Woodmansey et al. |

FOREIGN PATENT DOCUMENTS

| | | |
|---|---|---|
| GB | 2365185 | 2/2002 |
| JP | 2002-507015 | 3/2002 |
| JP | 2002-334220 | 11/2002 |
| JP | 2002-352080 | 12/2002 |
| JP | 2004-046454 | 2/2004 |
| JP | 2004-310761 | 11/2004 |
| JP | 2005-174158 | 6/2005 |
| WO | WO 98/28900 | 7/1998 |
| WO | WO 98/49639 | 11/1998 |
| WO | WO 99/26173 | 5/1999 |
| WO | WO 99/27476 | 6/1999 |
| WO | WO 99/46658 | 9/1999 |
| WO | WO 00/03342 | 1/2000 |
| WO | WO 00/08578 | 2/2000 |
| WO | WO 00/21013 | 4/2000 |
| WO | WO 00/39719 | 7/2000 |
| WO | WO 2005/055004 | 6/2005 |

OTHER PUBLICATIONS

USPTO Notice of Allowance and Fees Due and Examiner Interview Summary for U.S. Appl. No. 12/687,417, dated Dec. 9, 2010 (26 pages).

European Communication and Supplementary Search Report for Application No. EP 06839417.0, dated Apr. 7, 2011 (9 pages).

European Communication and Supplementary Search Report for Application No. EP 06845758.9, dated Apr. 15, 2011 (10 pages).

Australian Notice of Acceptance for Application No. 2006252168, dated May 26, 2011 (3 pages).

(56) References Cited

OTHER PUBLICATIONS

Australian Exam Report for Application No. 2006252169, dated Jun. 16, 2011 (2 pages).
Japanese Office Action with English translation for Application No. 2006-342248, dated May 24, 2011 (7 pages).
USPTO Office Action for U.S. Appl. No. 11/084,547, dated May 24, 2011 (11 pages).
U.S. Appl. No. 11/399,019, filed Apr. 5, 2006, Claus et al.
U.S. Appl. No. 12/687,372, filed Jan. 14, 2010, Claus et al.
U.S. Appl. No. 11/399,112, filed Apr. 5, 2006, Claus et al.
U.S. Appl. No. 12/687,417, filed Jan. 4, 2010, Claus et al.
U.S. Appl. No. 09/627,705, filed Jul. 28, 2000, Woodmansey et al.
U.S. Appl. No. 11/084,547, filed Mar. 18, 2005, Woodmansey et al.
Notification of Transmittal of the International Search Report and the Written Opinion of the International Searching Authority for International Application No. PCT/US06/48328; dated Sep. 24, 2007 (8 pages).
International Preliminary Report on Patentability for International Application No. PCT/US06/48328; dated Jul. 8, 2008 (4 pages).
Notification of Transmittal of the International Search Report and the Written Opinion of the International Searching Authority for International Application No. PCT/US06/48391; dated Sep. 15, 2008 (7 pages).
International Preliminary Report on Patentability for International Application No. PCT/US06/48391; dated Oct. 16, 2008 (5 pages).
USPTO Office Action for U.S. Appl. No. 11/399,019, dated Apr. 2, 2009 (7 pages).
U.S. Appl. No. 12/615,079, filed Nov. 9, 2009, Woodmansey et al.
USPTO Office Action for U.S. Appl. No. 11/399,112, dated Mar. 3, 2009 (10 pages).
Australian Examiner's Report for AU Application No. 2006252168, dated Sep. 30, 2009 (1 page).
Australian Examiner's Report for AU Application No. 2006252169, dated Oct. 7, 2009 (2 pages).
USPTO Office Action for U.S. Appl. No. 09/627,705, dated Dec. 5, 2002 (6 pages).
USPTO Office Action for U.S. Appl. No. 09/627,705, dated Apr. 8, 2003 (6 pages).
USPTO Office Action for U.S. Appl. No. 09/627,705, dated Nov. 5, 2003 (7 pages).
USPTO Office Action for U.S. Appl. No. 09/627,705, dated Sep. 14, 2004 (5 pages).
USPTO Office Action for U.S. Appl. No. 09/627,705, dated Jul. 26, 2005 (7 pages).
USPTO Examiner's Interview Summary for U.S. Appl. No. 09/627,705, dated Aug. 16, 2004 (3 pages).
USPTO Examiner's Interview Summary for U.S. Appl. No. 09/627,705, dated Jan. 20, 2006 (3 pages).
USPTO Notice of Allowance for U.S. Appl. No. 09/627,705, dated May 4, 2006 (14 pages).
USPTO Notice of Allowance for U.S. Appl. No. 09/627,705, dated Sep. 22, 2006 (14 pages).
USPTO Office Action for U.S. Appl. No. 11/084,547, dated Sep. 6, 2006 (7 pages).
USPTO Office Action for U.S. Appl. No. 11/084,547, dated Jun. 27, 2007 (12 pages).
USPTO Office Action for U.S. Appl. No. 11/084,547, dated Oct. 3, 2007 (3 pages).
USPTO Examiner's Answer to Appeal Brief for U.S. Appl. No. 11/084,547, dated Sep. 15, 2008 (19 pages).
Canadian Office Action for Application No. 2380848, dated Sep. 30, 2008, 2 pp.
International Preliminary Examination Report for PCT Application No. PCT/US00/21098, dated Dec. 28, 2001, 4 pp.
U.S. Appl. No. 60/146,971, filed Aug. 3, 1999, 25 pp.
U.S. Appl. No. 60/753,095, filed Dec. 20, 2005 (36 pages).
USPTO Notice of Allowance and Fees Due and Examiner Interview Summary for U.S. Appl. No. 11/399,019, dated Dec. 11, 2009 (38 pages).
USPTO Notice of Allowance and Fees Due and Examiner Interview Summary for U.S. Appl. No. 11/399,112, dated Dec. 14, 2009 (41 pages).
USPTO Office Action for U.S. Appl. No. 11/084,547, dated Mar. 4, 2010 (10 pages).
Canadian Examination Report for Application No. 2380848, dated May 7, 2010 (3 pages).
USPTO Response to Amendment under Rule 312 for U.S. Appl. No. 11/399,019, dated Mar. 12, 2010 (2 pages).
USPTO Response to Amendment under Rule 312 for U.S. Appl. No. 11/399,112, dated Mar. 12, 2010 (2 pages).
USPTO Notice of Allowance and Fees Due and Examiner Interview Summary for U.S. Appl. No. 12/687,372, dated Sep. 9, 2010 (43 pages).
USPTO Office Action for U.S. Appl. No. 12/953,818, dated Nov. 30, 2011 (10 pages).
USPTO Office Action for U.S. Appl. No. 12/953,838, dated Nov. 7, 2011 (6 pages).
Canadian Examination Report for Application No. 2380848, dated Oct. 14, 2011 (3 pages).
Canadian Examination Report for Application No. 2572393, dated Nov. 17, 2011 (6 pages).
Japanese Office Action with English translation for Application No. 2006-342248, dated Jan. 24, 2012 (6 pages).
Canadian Examination Report for Application No. 2572386, dated Feb. 29, 2012 (4 pages).
Pre-Appeal Conference Decision for Application No. 12/953818, dated Feb. 5, 2013 (2 pages).
USPTO Office Action for U.S. Appl. No. 12/953,818, dated Jun. 19, 2012 (13 pages).
USPTO Office Action for U.S. Appl. No. 12/953,838, dated Jun. 14, 2012 (12 pages).
Australian Notice of Acceptance for Application No. 2011221406, dated Jul. 17, 2012 (3 pages).
Japanese Office Action with English translation for Application No. 2006-342247, dated May 22, 2012 (11 pages).
USPTO Office Action for U.S. Appl. No. 12/909,728, dated Jan. 11, 2013 (7 pages).
USPTO Office Action for U.S. Appl. No. 12/948,060, dated Jan. 4, 2013 (7 pages).
USPTO Office Action for U.S. Appl. No. 12/948,101, dated Jan. 3, 2013 (7 pages).
USPTO Office Action for U.S. Appl. No. 12/948,119, dated Jan. 22, 2013 (6 pages).
USPTO Notice of Allowance and Fees Due and Examiner Interview Summary Record for U.S. Appl. No. 12/953,838, dated Mar. 12, 2013 (19 pages).
USPTO Office Action for U.S. Appl. No. 13/621,220, dated Mar. 22, 2013 (10 pages).
Australian Examiner's Report for AU Application No. 2011203334, dated Feb. 25, 2013 (2 pages).
Japanese Office Action with English translation for Application No. 2006-342247, dated Apr. 2, 2013 (4 pages).
USPTO Examiner's Answer for U.S. Appl. No. 12/953,818, dated Oct. 10, 2013 (10 pages).
USPTO Office Action for U.S. Appl. No. 13/621,220, dated Nov. 22, 2013 (15 pages).
USPTO Notice of Panel Decision for U.S. Appl. No. 13/621,220, dated May 12, 2014 (2 pages).
Canadian Examination Report for Application No. 2,620,184, dated Sep. 12, 2013 (5 pages).
Canadian Examination Report for Application No. 2,572,386, dated Aug. 1, 2013 (4 pages).
"Foreign content rule gets tossed", National Post, http://www.canada.com/finance/rrsp/story.html?id=8d7911c9-878d-4de5-95e9-67d58dcb81f6, dated Feb. 28, 2005.
European Office Action for Application No. 06839417.0 dated Jan. 27, 2014 (7 pages).

(56) References Cited

OTHER PUBLICATIONS

European Office Action for Application No. 06845758.9 dated Jan. 27, 2014 (8 pages).
USPTO Office Action for U.S. Appl. No. 13/621,231, dated Jul. 3, 2013 (10 pages).
USPTO Office Action and Examiner Interview Summary Record for U.S. Appl. No. 13/621,231, dated Apr. 9, 2014 (9 pages).
USPTO Office Action for U.S. Appl. No. 11/084,547, dated Sep. 17, 2013 (14 pages).
USPTO Office Action for U.S. Appl. No. 12/909,728, dated Oct. 29, 2013 (6 pages).
Canadian Examination Report for Application No. 2380848, dated Jul. 4, 2013 (3 pages).
Canadian Examination Report for Application No. 2380848, dated Mar. 14, 2016 (4 pages).
Japanese Office Action with English translation for Application No. 2013-161448, dated Nov. 22, 2016 (16 pages).
European Summons to Attend Oral Proceedings for Application No. 06839417.0 dated Apr. 10, 2017 (9 pages).
Japanese Office Action with English translation for Application No. 2016-047097, dated Mar. 21, 2017 (7 pages w/English Translations).
Australian Examiner's Report for AU Application No. 2016266008, dated Nov. 27, 2017, 3 pages.
Australian Examiner's Report for Application No. 2012244224, dated Aug. 26, 2014, 2 pages.
Australian Examiner's Report for Application No. 2014268143 dated Dec. 2, 2015, 2 pages.
Australian Examiner's Report for Application No. 201620336 dated May 10, 2017, 3 pages.
Canadian Examination Report for Application No. 2572393, dated Oct. 23, 2014 (6 pages).
Canadian Notice of Allowance for Application No. 2572393, dated Jan. 11, 2016 (1 page).
Canadian Examination Report for Application No. 2572386, dated Sep. 30, 2014 (2 pages).
Canadian Examination Report for Application No. 2572386, dated Sep. 24, 2015 (8 pages).
Japanese Office Action with English translation for Application No. 2013-161448, dated Nov. 10, 2015 (6 pages).

|  | Direct | Cash | CBOT 8% | CX 8% | CX 6% |
|---|---|---|---|---|---|
| Basis | X | X | -- | -- | X |
| Spreads | X | X | -- | -- | -- |

SYSTEMS AND METHODS FOR LINKING ORDERS IN ELECTRONIC TRADING SYSTEMS

CROSS REFERENCE TO RELATED APPLICATIONS

This application is a continuation of U.S. patent application Ser. No. 11/084,547, filed Mar. 18, 2005, which is hereby incorporated by reference herein in its entirety, and which is a continuation of U.S. patent application Ser. No. 09/627,705, filed Jul. 28, 2000 (now U.S. Pat. No. 7,155,410, issued on Dec. 26, 2006), which is hereby incorporated by reference herein in its entirety, and which claims the benefit of U.S. Provisional Patent Application No. 60/146,971, filed Aug. 3, 1999, entitled AUTOMATED LINKED ORDER PROCESSOR, which is hereby incorporated by reference herein in its entirety.

BACKGROUND OF THE INVENTION

The present invention relates to systems and methods for linking orders in electronic trading systems. More particularly, the present invention relates to systems and methods which enable traders to link trading of goods, services, financial instruments, and commodities in electronic trading systems.

In recent years, electronic trading systems have gained wide spread acceptance for trading of a wide variety of goods, services, financial instruments, and commodities. For example, electronic trading systems have been created which facilitate the trading of financial instruments and commodities such as stocks, bonds, currency, futures, oil, gold, pork bellies, etc. As another example, online auctions on the Internet have become popular markets for the exchange of services and both new and used goods. In one embodiment of systems for electronic trading of financial instruments, for example, a first trader may submit a "bid" to buy a particular number of 30 Year U.S. Treasury bonds at a given price. In response to such a bid, a second trader may submit a "hit" in response to the bid in order to indicate a willingness to sell bonds to the first trader at the given price. Alternatively, the second trader may submit an "offer" to sell the particular number of the bonds at the given price, and then the first trader may submit a "take" or "lift" in response to the offer to indicate a willingness to buy bonds from the second trader at the given price. In such trading systems, the bid, the offer, the hit, and the take (or lift) are collectively know as "orders". Thus, when a trader submits a bid, the trader is said to be submitting an order.

Modern day trading includes not only the buying and selling of a single type of item, but also more complex transactions involving exchanges of a combination of the same or different types of items. For example, in a typical spread transaction, one bond may be sold and another bond may be purchased as part of a single transaction. The trading of combinations of items in this way facilitates arbitrage, hedging, and speculation.

However, because such combinations of items may have very complex relationships, there is a need to automate the trading of combinations of items. Thus, it is an object of the present invention to provide systems and methods for linking orders in electronic trading systems.

SUMMARY OF THE INVENTION

In accordance with this and other objects of the invention, systems and methods for linking orders in electronic trading systems are provided. Preferred systems and methods in accordance with the present invention enable a trader to select two or more items that are to be linked and specify linking parameters for those items. Any desired set of items may be linked, and the linking parameters may include price adjustments, order sequencing instructions, automatic/manual execution controls, execution delays commands, and update frequency limits. Upon detecting a bid or offer for a linked item, the systems and methods may then determine a size and a price for each linked item based upon the size and the price of the bid or offer for the first linked item. In this way, the sizes and the prices for the other linked items may be propagated from the size and the price for the first item. Once the size and the price for each item is determined, the systems and methods may submit orders for the items in accordance with the linking parameters. In the case where orders for linked items may only be submitted in designated lot sizes, the systems and methods may round the sizes of the orders to the designated lot sizes, and then submit remainder orders to make up for the rounding.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which.

DETAILED DESCRIPTION OF THE INVENTION

As stated above, the present invention provides systems and methods for linking orders in electronic trading systems. More particularly, the present invention provides systems and methods that enable traders to link two or more items for trading and specify parameters for controlling placement of orders for those items, and that automatically monitor bids and offers placed for those items, generate sizes and prices for orders related to those items, and place the corresponding orders for those items.

Although the present invention is described herein as being used by "traders," it should be apparent that the term "trader" is meant to broadly apply to any user of a trading system, whether that user is an agent acting on behalf of a principal, a principal, an individual, a legal entity (such as a corporation), etc., or any machine or mechanism that is capable of placing and/or responding to orders in a trading system.

Preferred embodiments of the systems and methods of the present invention are now described in greater detail in connection with FIGS. 1-6. In the examples which follow, trading of U.S. Treasury bonds, notes, and bond futures contracts, and their derivatives (e.g., spreads and basis), are used to illustrate various aspects of the present invention. Trading of these instruments is typically accomplished at a given price for a given size.

Notwithstanding that the present invention is illustrated with respect to trading of bonds, notes, and bond futures, and their derivatives, it should be noted that the systems and methods of the present invention are equally applicable to the trading of any type of goods, services, financial instruments, commodities, etc.

Figure 1:
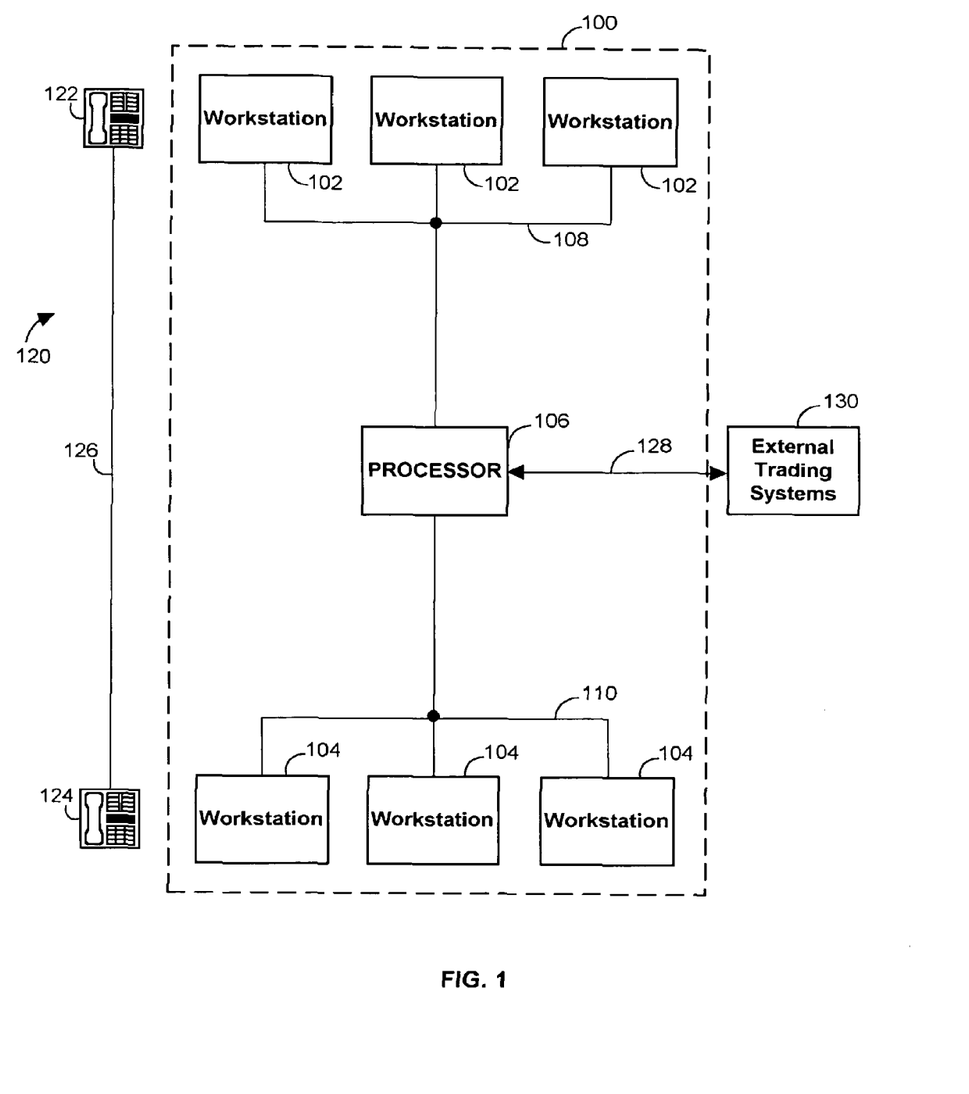
FIG. 1 is block diagram of hardware that may be used to implement one embodiment of the present invention.

Turning first to FIG. 1, an example of hardware 100 that may be used to implement one embodiment of the present invention is shown. As illustrated, hardware 100 may include one or more local workstations 102 and one or more remote workstations 104 that may be used by traders to view trading data and enter trading commands. Workstations 102 and 104 may be any suitable means for presenting data and, in preferred embodiments of this invention, accepting input. For example, workstations 102 and 104 may be personal computers, laptop computers, mainframe computers, dumb terminals, data displays, Internet browsers, Personal Digital Assistants (PDAs), two-way pagers, wireless terminals, portable telephones, etc., or any combination of the same.

To orchestrate trading between traders using workstations 102 and 104, the workstations preferably submit commands to, and receive data to be displayed from, a processor 106. In alternative embodiments, however, workstations may communicate with additional processors, or include processors to orchestrate trading in a distributed fashion without requiring processor 106. Processor 106, and any additional processors, may be any suitable circuitry or devices capable of processing data such as microprocessors, personal computers, network servers, mainframe computers, dedicated computer systems, etc.

As shown, processor 106 may be connected to workstations 102 and 104 by networks 108 and 110, respectively. Each of networks 108 and 110 may be any suitable data network for communicating data between workstations 102 and 104 and processor 106, such as a local area network, a wide area network, the Internet, an Intranet, a wireless network, a hard wired connection, a dial-up network, etc., or any combination of the same. In an arrangement of hardware 100 without processor 106, workstations 102 and 104 may be linked together by networks 108 and 110 directly.

As also shown in FIG. 1, a telephone network 120 may be provided that comprises a local telephone 122 and a remote telephone 124 connected by a telephone line 126. Telephone network 120 may be used to enable a trader at a remote location to communicate with an operator at a workstation 102 or 104. This may be useful when the trader does not have access to a workstation 102 or 104 or when the trader only has access to a display-only workstation 102 or 104. Obviously, telephone network 120 may be implemented as a private telephone network, a public telephone network, a wireless telephone network, or any suitable combination of the same.

In order to communicate with external trading systems 130, hardware 100 may include a network interface 128 that connects processor 106 to external trading systems 130. Network interface 128 may be any suitable interface and/or computer network that facilitates communication between processor 106 and external trading systems 130.

When used to implement a bid/offer, hit/take trading system as described above, hardware 100 may enable a trader to submit a bid to buy, or an offer to sell, an item at one of workstations 102 and 104. This bid or offer may then be communicated to processor 106, where the bid or offer can be ranked and stored in a bid-offer queue. The ranking may be based upon time of submission, price, or any other suitable criterion. The bid or offer may then be presented to other traders via other workstations 102 and 104 dependent upon its ranking in the bid-offer queue. Once displayed, the bid or offer can then be hit or taken by one or more of the other traders so that a trade of the item can proceed to execution. Alternatively, hardware 100 may be configured so that it does not operate as a trading system, but instead facilitates communication between traders and external trading systems 103, and performs the order linking functions described herein.

Figure 2A:
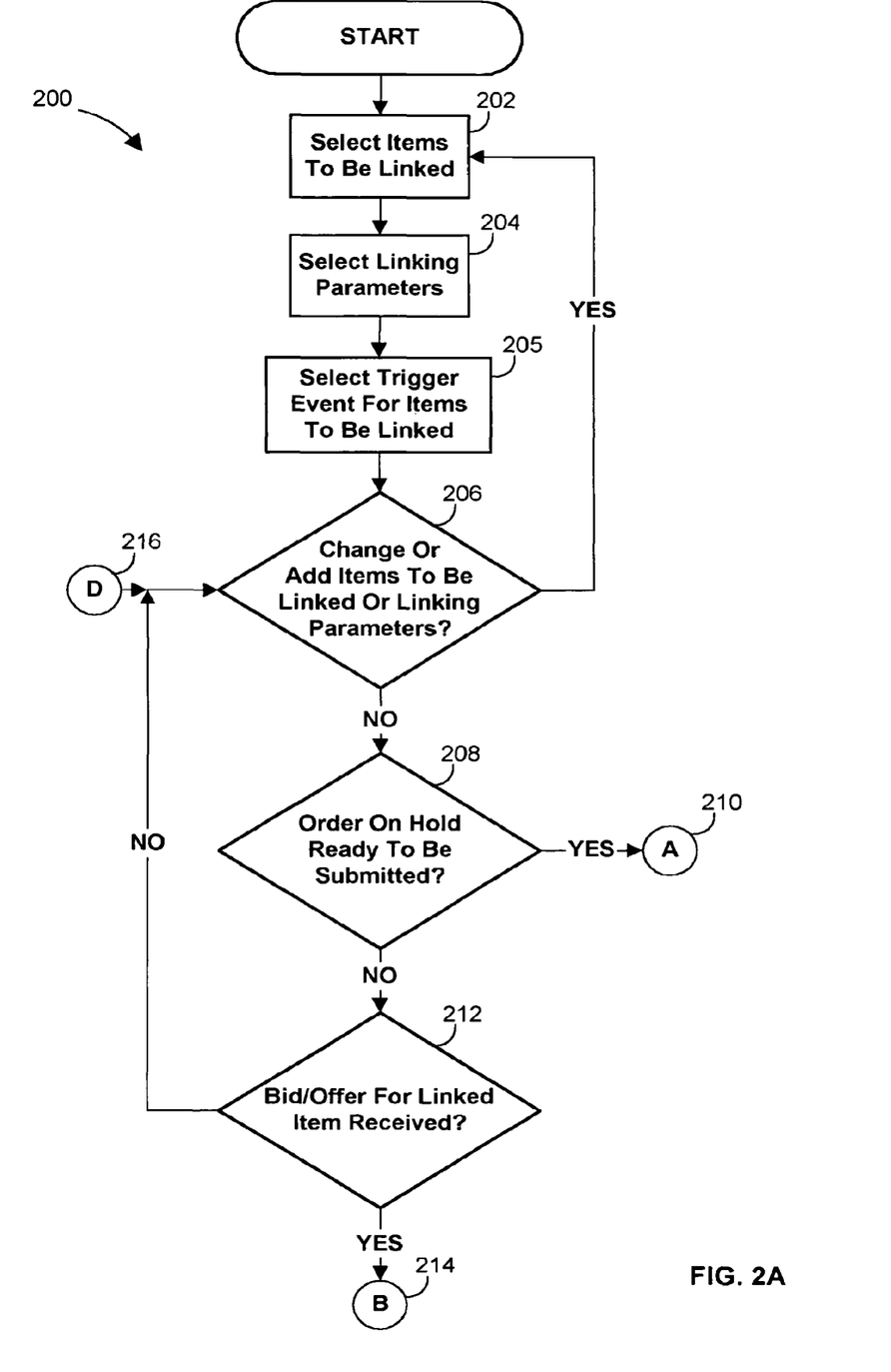
FIGS. 2A-2C are flow diagrams illustrating a linking process in accordance with one embodiment of the present invention.
Figure 2B:
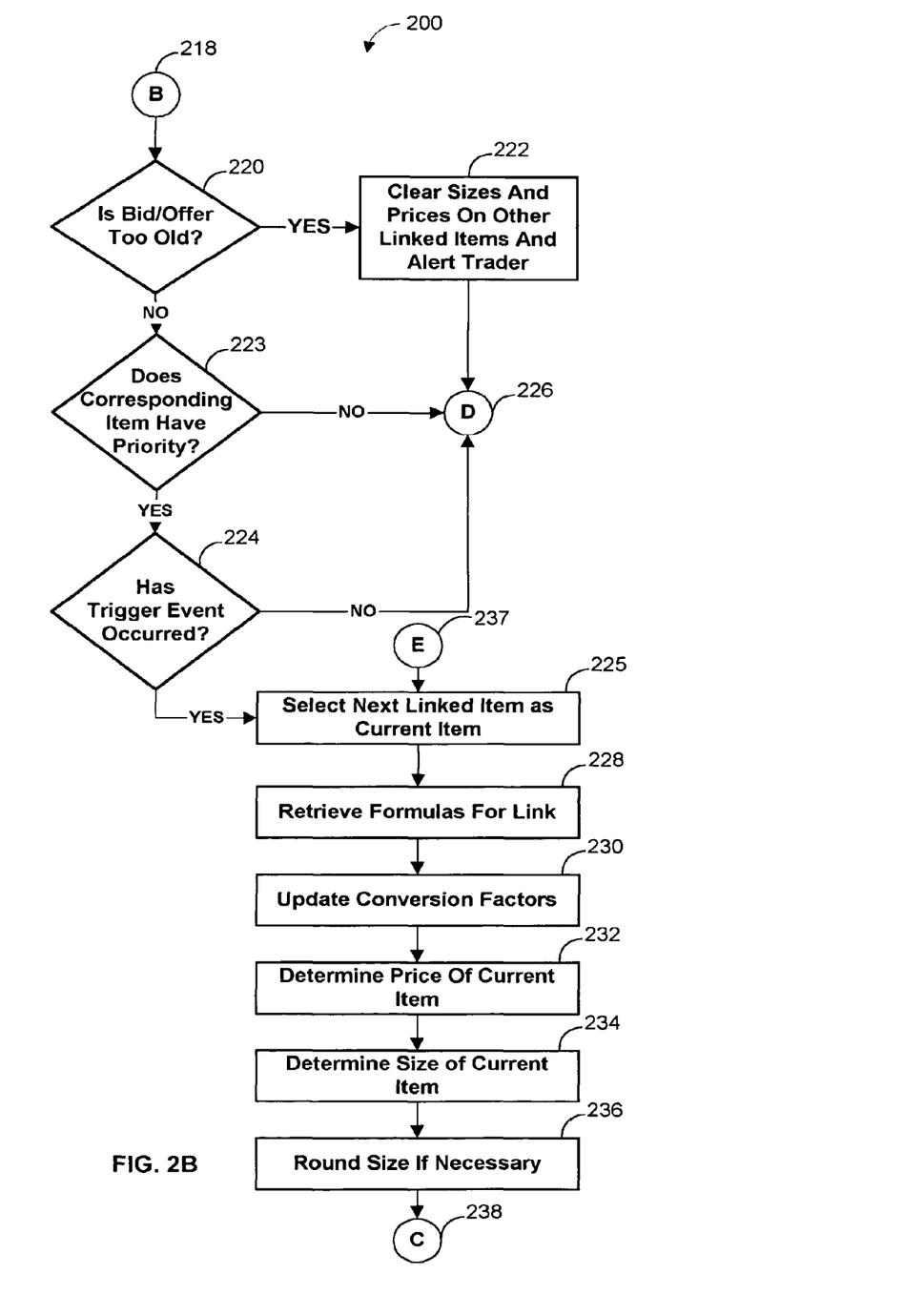
Figure 2C:
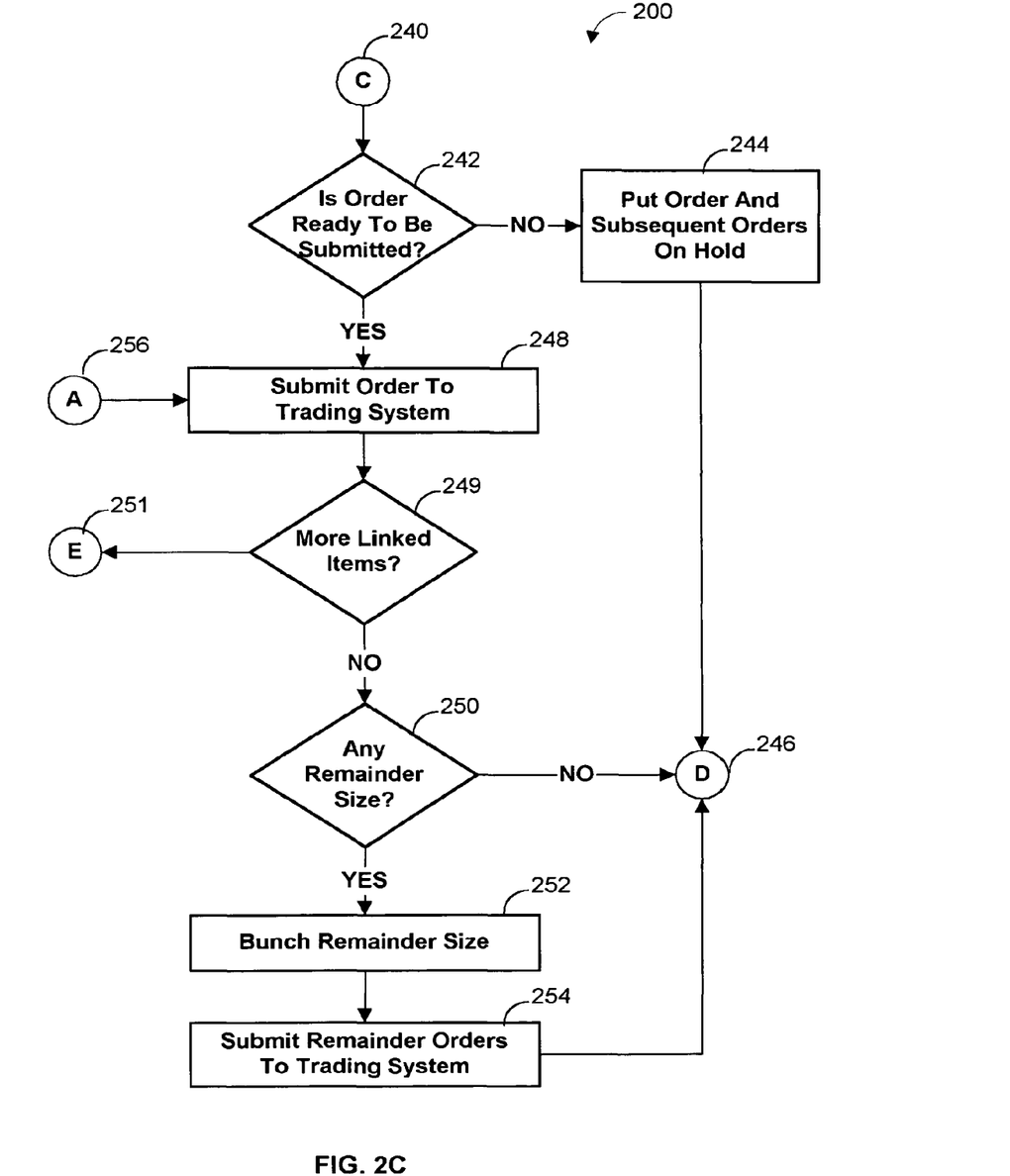

Turning to FIGS. 2A-2C, one embodiment of a linking process 200 that may be executed in processor 106 in accordance with the present invention is illustrated. As shown in FIG. 2A, once process 200 has begun, the process enables traders to select items to be linked at step 202. The linking of items may occur in the same market (e.g., only in the bond market) or in different markets (e.g., one in the bond market and another in the futures market) whether or not those different markets are related in any way. Similarly, items that are traded in different trading systems may be linked.

Figure 3:
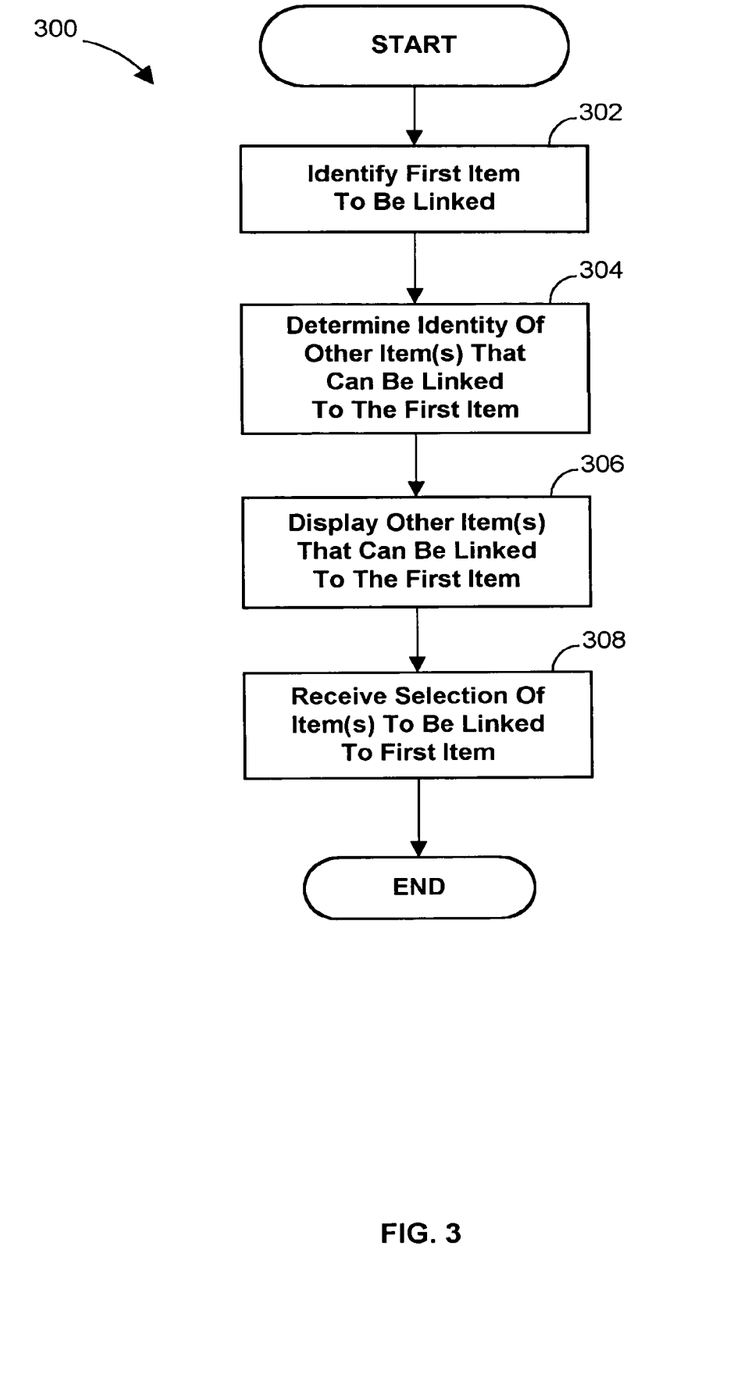
FIG. 3 is a flow diagram of an item selection process in accordance with one embodiment of the present invention.

One embodiment of an instrument linking process 300 that may be executed at step 202 in accordance with the present invention is illustrated in FIG. 3. As shown, process 300 initially allows a trader to identify a first item to be linked in the trading system at step 302. The trader may identify that the item is to be linked in any suitable fashion. For example, the trader may enter keystrokes on a workstation 102 or 104 (FIG. 1) which indicate that the trader would like to link a 10-year treasury bond. Alternatively, the trader may select the item from a graphical user interface that presents a menu of available items to be linked.

Next, at step 304, process 300 determines the identity of other instruments to which the first item identified at step 302 can be linked. This determination may be made by searching a database of items that are related to the first item, or in any other suitable manner. In the case where a trader has selected to link a 10-year treasury bond, for example, such a search may reveal that there are three different types of related futures contracts which are traded in two different markets (e.g., an 8% notional bond contract that is traded on the Chicago Board of Trade, an 8% notional bond contract that is traded on the Cantor Exchange, and a 6% notional bond contract that is traded on the Cantor Exchange). A possible linked trade involving such items could include buying the basis of the bond, that is, buying the bond on the cash market and selling an equivalent amount of futures contracts.

Figure 4:
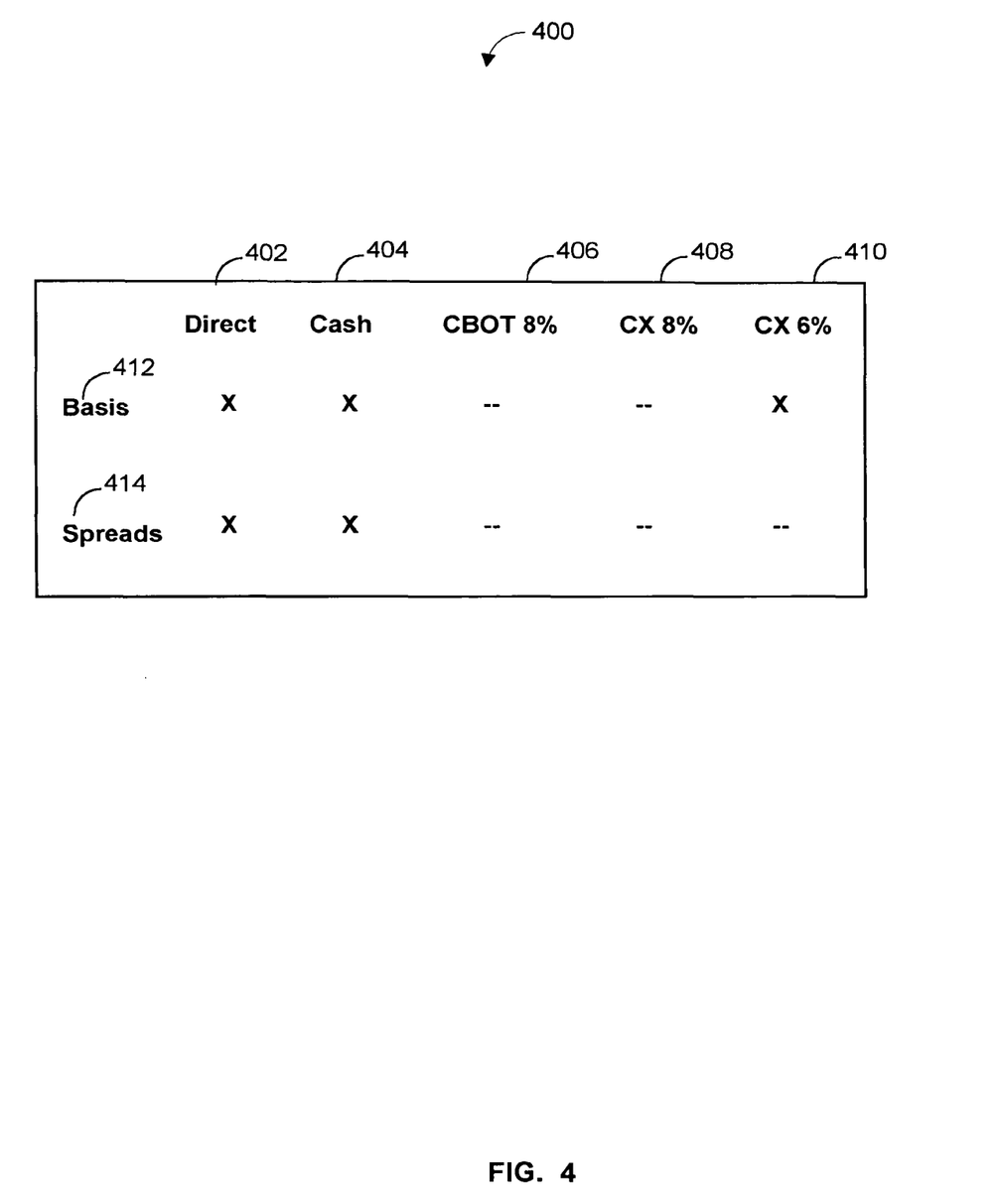
FIG. 4 is an illustration of an item selection display in accordance with one embodiment of the present invention.

Once process 300 has identified other items that can be linked to the first item at step 304, process 300 creates a display listing the related instruments at step 306. An example of such a display 400 is illustrated in FIG. 4. Because the trader in the example underlying display 400 has selected to link a 10-year treasury bond, display 400 indicates two ways in which this bond can be linked—i.e., for basis trades and for spread trades (as indicated by rows 412 and 414). As stated above, a basis trade is one in which the trader buys a bond and sells a corresponding futures contract. A spread trade, on the other hand, is one in which the trader buys one bond and sells another.

As shown, display 400 contains five columns 402, 404, 406, 408, and 410 identifying the different items that can be linked. In the case of the exemplary 10-year treasury bond, this bond is available on the cash market as indicated by column 404, and three corresponding future contracts are available on the Chicago Board of Trade (CBOT 8%) and on the Cantor Exchange (CX 8% and CX 6%) as indicated by columns 406, 408, and 410. Because display 400 indicates that the bond can be linked for basis trades and spread trades, the display also indicates that the basis and the spread for this bond can be purchased on the direct market by column 402.

Referring back to FIG. 3, at step 308, process 300 next enables the trader to select the items that the trader wants to link. As shown in FIG. 4, this may be accomplished by placing "X's" in the grid formed by columns 402, 404, 406, 408, and 410 and rows 412 and 414. In the example illustrated in FIG. 4, the trader has linked the cash market for the bond with the direct market for the basis of the bond and the CX 6% market. The trader has also linked the cash market for the bond with the direct market for the spread of the bond.

Because the trader in this case has linked the direct market for the basis of the bond with the cash market for the bond and has linked the direct market for the spread of the bond with the cash market for the bond, preferred embodiments of the invention also transitively link the direct market for the basis of the bond to the direct market for the spread of the bond through the cash market for the bond.

Alternatively to determining items that can be linked to a first item and to displaying and selecting items that can be linked to the first item through an interface, as shown in steps 304, 306, and 308 of FIG. 3 and display 400 of FIG. 4, the present invention may be implemented in any other suitable fashion to enable a trader to specify items to be traded. For example, a trader may be permitted to specify particular items to be linked on a pair basis. Then to enable three items to be linked, the trader could simply link each of a first item and a second item with a third item. Because of the transitive linking aspect of the invention, the three items would then be linked. One way in which such a linking specification may be made is through the use of a command line entry mechanism wherein the trader may specify an identifier for a first bond and an identifier for a second bond to indicate the pair to be linked.

Referring back to FIG. 2A, once a trader has selected items to be linked at step 202, the trader is then permitted to select linking parameters for the linked items at step 204. In preferred embodiments of the invention, the trader is preferably permitted to select parameters that adjust the pricing of those items, sequence the placement of orders (i.e., bids, offers, hits, and takes) related to those items, indicate whether orders are to be placed automatically or manually, indicate whether there is to be a delay in the placement of orders for those items, and indicate the maximum frequency at which updates to orders for those items are to be placed.

Figure 5:
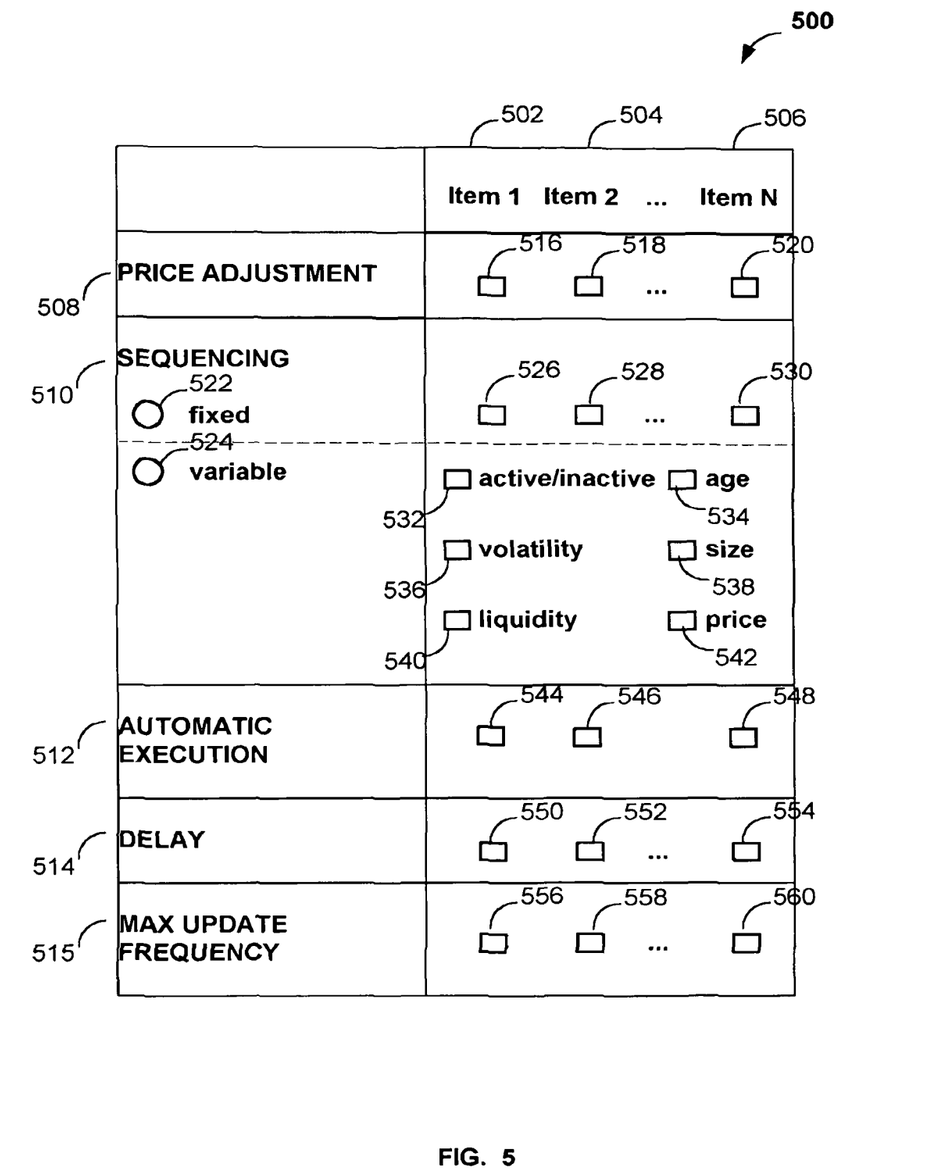
FIG. 5 is an illustration of a linking parameter specification interface in accordance with one embodiment of the present invention.

An example of an interface 500 for enabling a trader to make these settings is illustrated in FIG. 5. As shown, interface 500 indicates three items 502, 504, and 506. The number of items indicated in interface 500 may be any number and is preferably all of the items in a set of linked items. For the indicated items, interface 500 enables a trader to specify price adjustments, sequencing requirements, execution methods, order placement delays, and maximum update frequencies as indicated by rows 508, 510, 512, 514, and 515.

Price adjustments may be configured in interface 500 by specifying a number in fields 516, 518, or 520 that is to be added to the price of the corresponding item that may otherwise be determined by the linking engine as explained below. For example, if the trader is linking a bond and a futures contract for a basis trade, the trader may want to offer the futures contract at a higher price than the market value for that futures contract as calculated from the market value for the bond. In this case, the trader would indicate the increase in the offer price of the futures contract over market in the corresponding one of fields 516, 518, and 520.

Sequencing may be configured in interface 500 by first selecting one of a "fixed" radio button 522 and a "variable" radio button 524. Then, if radio button 522 is selected, the sequencing settings may be completed by filling in the numerical sequence of placement of orders in fields 526, 528, and 530. For example, in order to cause orders for item 2 to always be placed before orders for item 1, and orders for item 1 to always be placed before orders for item N, the numbers "1," "2," and "3" would be placed in fields 528, 526, and 530, respectively. Alternatively, if radio button 524 is selected, the sequencing settings may be completed by filling in the numerical sequence of priority in sorting that is to be performed in fields 532, 534, 536, 538, 540, and 542. For example, in order to cause placement orders to be based upon priority of age and size, a "1" would be placed in field 534 and a "2" would be placed in field 538. In this way, the items would be sorted first by age and then by size to determine sequence of order placement. By not filling in some of fields 532, 534, 536, 538, 540, and 542, sorting may be reserved to corresponding categories in the completed fields. Although particular categories to control variable sequencing are shown in FIG. 5 for the sake of illustration, any suitable categories may be used in accordance with the present invention.

In order to control whether orders are placed automatically or manually, the trader may select any of check boxes 544, 546, and 548 for the corresponding item 502, 504, and 506. For example, to cause item 502 to be executed automatically and item 504 and item 506 to be executed manually, the trader would select check box 544 and clear check boxes 546 and 548.

To set the delay to be applied to the placement of orders for items 502, 504, and 506, the trader may fill in fields 550, 552, and 554 with the appropriated delay period (e.g., 10 seconds). For example, if the trader wanted to cause the placement of orders for item 504 to be delayed by 1 minute, but orders for items 502 and 506 to be placed without delay, the trader would enter "60" in field 552 and leave fields 550 and 554 blank (or enter "0").

Finally, in order to indicate the maximum frequency at which updates to orders for items may be placed, a trader may fill in the maximum frequency for order updates in desired ones of fields 556, 558, and 560 for corresponding items 502, 504, and 506. For example, in order to limit order updates to once every ten seconds for item 504, the trader may enter "6" in field 558 to indicate a maximum of six updates per minute.

Although particular linking parameters are illustrated and discussed in connection with FIG. 5, any suitable set of linking parameters may be used in accordance with the present invention. Moreover, the linking parameters that are available may change dynamically as a function of the items that are selected to be linked. For example, when linking bonds to a corresponding futures contracts, hedge ratio linking parameters may be made available for specification by traders.

Turning back to FIG. 2A, once linking parameters have been specified at step 204, process 200 allows the trader to select a trigger event to be used to trigger linking of the linked items. Until the trigger event occurs, linking of the items is preferably not performed in accordance with the present invention. The trigger event may be the occurrence of a linked item having a certain price, size, yield, or any other characteristic, or rate of change of the same. Similarly, the trigger event may be the occurrence of two or more linked items having an average, a difference, a ratio, or any other suitable relationship in price, size, yield, rate of change of the same, etc. As yet another possibility, the trigger event may be only peripherally related or completely unrelated to any of the linked items. For example, the trigger event could be a market index reaching a certain value, a certain date having occurred, a certain business transaction closing, or an unlinked item in having a certain price, size, yield, etc. Naturally, any suitable interface may be utilized to enable the trader to select the trigger event.

Next, process 200 determines at step 206 if a trader wants to change or add items to be linked or linking parameters. If so, process 200 loops back to step 202. Otherwise, process 200 determines whether an on-hold order is ready to be submitted at step 208. An order may be on-hold if, for example, a delay was specified for submission of an order through interface 500 (FIG. 5). Similarly, an order may be on-hold if the sequencing parameter for the order (as configured in interface 500 (FIG. 5)) indicates that the order has not come up in the sequence for submission, if the order is to be manually submitted, or if the maximum update frequency for the corresponding item has been reached. If an on-hold order is ready to be submitted, process 200 then proceeds through links 210 and 256 (FIG. 2C) to step 248 (FIG. 2C). Otherwise, process 200 determines at step 212 whether a bid or offer for a linked item has been received. If not, process 200 loops back to step 206. Otherwise, process 200 proceeds through links 214 and 218 (FIG. 2B) to step 220 (FIG. 2B).

Turning to FIG. 2B, it can be seen that at step 220, process 200 next determines whether the received bid or offer is too old to support linking. Whether a bid or offer is too old may be based upon any suitable determination. For example, a system parameter may indicate that a bid or offer is too old to support linking when it has been outstanding for a given period of time. Alternatively, traders may be permitted to designate at what point a bid or offer becomes too old to support linking through an interface like interface 500 (FIG. 5). If the bid or offer is too old, then process 200, at step 222, clears the sizes and prices of other linked items that are based upon that bid or offer, and alerts traders that selected links involving the item corresponding to that bid or offer. Once the traders have been alerted at step 222, process 200 loops back to step 206 (FIG. 2A) via links 226 and 216 (FIG. 2A).

If the bid or offer is determined not to be too old at step 220, however, then process 200 determines at step 223 whether the item corresponding to the bid or offer has priority. Priority may be based on a test of which bid or offer in a set of linked items was bid or offered last, a test of the type of item (e.g., futures contract versus bond), or a test of the activity status of the item (e.g., active or inactive). Which of these tests determines whether an item has priority may be selected by a trader in a manner similar to selecting the sequencing order in interface 500 (FIG. 5). If the item does not have priority, process 200 loops back to step 206 (FIG. 2A) via links 226 and 216 (FIG. 2A).

If the bid or offer is determined to have priority at step 223, however, then process 200 determines at step 224 whether the trigger event has occurred for the linked items. As described above, any suitable trigger event may be used in accordance with the present invention.

Naturally, process 200 must be able determine whether the trigger event did in fact occur, so suitable data is preferably provided to process 200 for this purpose. If the event is determined not to have occurred, then process 200 loops back to step 206 (FIG. 2A) via links 226 and 216 (FIG. 2A).

If the trigger event is determined to have occurred at step 224, however, then process 200 selects the next linked item (i.e., the item linked to the item corresponding to the bid or offer) as the current item at step 225 and retrieves formulas for linking the current item with the previous item (i.e., the item corresponding to the bid or offer) at step 228. For many pairs of items, there are known formulas for translating a size and a price of one item to a size and a price of another item. Any suitable formula, relationship, or mechanism for translating size and price of one item into that of another item may be used in accordance with the present invention. For example, when trading basis, the price of a bond may be related to the price of a futures contract using the following formula:

$$\text{Bond Cash Market Price} = \text{Basis} + \text{Futures Price} \times \text{Conversion Factor}$$

Alternatively, a price of one item may be calculated based upon a yield of another item. Similarly, when trading basis, the size of a bond bid or offer is related to the size of a futures contract bid or offer typically using the following formula:

$$\text{Bond Cash Market Size} = \text{Hedge Ratio} / \text{Futures Market Size}$$

While conversion factors are published by the exchanges and data vendors, they need to be updated dynamically as issues mature and new contracts become open to trading. Process 200 dynamically updates these conversion factors at step 230 so that any financial instrument, including instruments that are not eligible for delivery, have current conversion factors for generating appropriate market accepted weightings for combination bidding and offering and buying and selling.

In the case where there are no standard formulas for translating the size and the price of an order for one item into a size and a price for order for another item, the trader may be permitted to specify a relationship through a suitable interface, or the trading system may use historical data relating to the items to estimate a relationship.

Next, process 200 determines the price of the order for the current item at step 232 and the size of the order for the current item at step 234 using the retrieved formulas. In addition to calculating the size of the order using a formula, due to restrictions on trading of certain items that require that those items be traded in specified minimum lot sizes (or a multiple thereof), process 200 may also round the size of the order for the item to a corresponding lot size (or a multiple thereof) at step 236. For example, US treasuries are typically traded in sizes that are multiples of one million dollars. In the event that a sizing formula indicates that a bid size for a bond should be $1.1 million based upon another trader's available bid for a linked futures contract, the bid size for the bond may be rounded to $1 million to conform to the lot size requirements. Once step 236 has been performed, process 200 proceeds from step 236 through links 238 and 240 (FIG. 2C) to step 242 (FIG. 2C).

Alternatively, a trader may be permitted to specify absolute values for the price and size of an item when linking items rather than specifying a formula or formulas relating the item to another item. In such a case steps 228 and 230 of process 200 may be skipped.

As shown in FIG. 2C, at step 242, process 200 determines if the order for the current item is ready to be submitted. An order may not be ready to be submitted if an order submission delay was specified through interface 500 (FIG. 5). Similarly, an order may be not be ready to be submitted if the sequencing parameter for the order (as configured in interface 500 (FIG. 5)) indicates that the order has not come up in the sequence for submission, if the order is to be manually submitted, or if the maximum update frequency for the corresponding item has been reached. In the event that an order is not ready to be submitted, process 200 then puts the order and subsequent orders for items that are linked to the current item on hold at step 244. Once the orders have been put on hold, process 200 loops back to step 206 (FIG. 2A) through links 246 and 216 (FIG. 2A).

If the order is ready to be submitted, however, process 200 then submits the order to a trading system at step 248. As explained above in connection with FIG. 1, this trading system may be implemented as part of hardware 100 or may be implemented in an external trading system 130 connected to hardware 100.

In preferred embodiments of the present invention, trading systems may enable process 200 to briefly lock the trading systems so that all of the orders for a set of linked items can be submitted without interference from external sources in response to a new bid or offer.

After process 200 has submitted the order, the process determines at step 249 if there are more linked items in the set of linked items containing the item corresponding to the received bid or offer. If so, then process 200 loops back to step 225 (FIG. 2B) via links 251 and 237 (FIG. 2B).

Using formulas, relationships, or mechanisms between transitively linked items, sizing and pricing of items can propagate through a chain of linked items in order to price one item from an otherwise un-associated item. For example, assume that an item A is linked to an item B, and the item B is linked to an item Z. If a size and a price are available for item A, that size and that price may be used to determine a size and a price for item B. Then using the determined size and the determined price for item B, a size and a price may be determined for item Z. This chaining of links could be used for any number of linked items.

If process 200 determines that there are no more linked items in a set of linked items at step 249, process 200 then proceeds to step 250 to determine if there is any remainder size from the rounding of the order sizes at step 236 (FIG. 2B). For example, in connection with the example given above where an order for a bond is rounded from a size of $1.1 million to $1 million, a remainder order may have a size of $0.1 million. Similarly, if a size is rounded up, there may be a remainder size for the over-order. For example, if a hit order is rounded up from $0.9 million to $1.0 million, a bid or lift remainder order may need to be submitted for the $0.1 remainder size.

If there is remainder size, process 500 then bunches the remainder sizes for separate trading at step 252 and submits the remainder orders to a suitable trading system for trading the remainder size at step 254. Once the remainder orders have been submitted, or if there is no remainder size, then process 200 loops back to step 206 (FIG. 2A) via links 246 and 216 (FIG. 2A).

Those skilled in the art will appreciate that the present invention can be practiced by other than the described embodiments, which are presented for purposes of illustration and not of limitation, and the present invention is limited only by the claims.

What is claimed is:

1. A method for facilitating electronic trading with interfaces of workstations of traders over a communication network, the method, comprising:

transmitting, by a computing device, data representing a plurality of financial instruments to be displayed on a display screen of an interface of a workstation of a trader;

receiving, by a computing device, from the interface of the workstation of the trader, data representing a selection of a first financial instrument from the plurality of financial instruments, wherein the first financial instrument is transacted in a first market;

receiving, by the computing device, from the interface of the workstation of the trader, data representing a selection of a second financial instrument from the plurality of financial instruments, wherein the second financial instrument is transacted in a second market, wherein the first financial instrument is different from the second financial instrument, and wherein the first financial instrument is to be linked to the second financial instrument;

transmitting, by the computing device, data representing a plurality of linking relationships to be displayed on a display screen of the interface of the workstation of the trader, wherein the data representing the plurality of linking relationships represents the first financial instrument and the second financial instrument;

after transmitting the data for displaying, receiving, by the computing device, from the interface of the workstation of the trader, a selection, from the plurality of linking relationships, a linking relationship between the first financial instrument and the second financial instrument;

monitoring, by the computing device, data representing bids and offers from at least one external electronic trading system, wherein the bids and offers comprise bids and offers for the first financial instruments and the second financial instrument; ranking and sorting, by the computing device, in a queue data structure in a memory of the computing device, the data representing the bids and offers for the first financial instruments and the second financial instrument;

in response to determining to submit an order to an external trading system, generate electronic signals representing lock commands that are transmitted to the external trading system to cause to lock the electronic trading system for a time period to allow orders for linked instruments to be submitted without interference from external sources in response a new bid or offer;

controlling, by the computing device, a submission of orders for the second financial instrument based at least in part on the linking relationship, wherein controlling the submission of orders for the second financial instrument comprises:

generating, by the computing device, a price of an order for the second financial instrument and a size of the order for the second financial instrument based at least in part on the linking relationship; and submitting, by the computing device, the order for the second financial instrument to a second electronic trading system; and wherein controlling the submission of orders for the second financial instrument based at least in part on the linking relationship further comprises:
limiting, by the computing device, order updates for the second financial instrument based at least in part on the linking relationship; and
performing, by the computing device, based at least in part on the linking relationship, at least one of the following:
adjusting the price of the second financial instrument relative to a market value for the second financial instrument;
sequencing the submission of orders for the second financial instrument relative to a submission of orders for the first financial instrument; and
holding orders for the second financial instrument for a time period.

2. The method of claim 1, further comprising:
determining, by the computing device, one or more financial instruments to which the first instrument can be linked, wherein the one or more financial instruments comprises the second financial instrument;
causing, by the computing device, the one or more financial instruments to be displayed at an interface at a workstation; and
wherein receiving, from the trader, the selection of the second financial instrument comprises: after causing the one or more financial instruments to be displayed, receiving, by the computing device, from the trader, the selection of the second financial instrument.

3. The method of claim 1, wherein the computing device comprises at least one of:
a workstation used by the trader;
an electronic trading system configured to rank and store bid and offers for instruments in a queue; and
a device that facilitates communication between the trader and an external trading system.

4. The method of claim 1, wherein the first market comprises a cash market and the second market comprises a futures market; and
wherein the first financial instrument comprises a bond and the second financial instrument comprises a corresponding futures contract for the bond.

5. The method of claim 1, wherein the first market and the second market are the same market;
wherein the first financial instrument comprises a first bond and the second financial instrument comprises a second bond.

6. The method of claim 1, wherein the first market and the second market are the same market;
wherein the first financial instrument comprises a first futures contract and the second financial instrument comprises a second futures contract.

7. The method of claim 1, wherein the second financial instrument comprises a derivative of the first financial instrument.

8. The method of claim 1, wherein the first financial instrument comprises a derivative of the second financial instrument.

9. The method of claim 1, wherein the at least one external trading system comprises the second trading system.

10. The method of claim 1, wherein the at least one external trading system and the second trading system are different trading systems.

11. The method of claim 1, further comprising: receiving, by the computing device, from the trader, a selection of a trigger event.

12. The method of claim 11, further comprising:
receiving data;
monitoring, by the computing device, the data;
determining, by the computing device, based at least in part on the data, that the trigger event has occurred.

13. The method of claim 12, further comprising: in response to determining that the trigger event has occurred, linking, by the computing device, the first financial instrument and the second financial instrument together.

14. The method of claim 1, wherein controlling the submission of orders for the second financial instrument comprises: controlling, by the computing device, the submission of orders for the second financial instrument based at least in part on the linking relationship based at least in part on a trader-selected trigger event having occurred.

15. The method of claim 1, further comprising: determining, by the computing device, that an event has occurred.

16. The method of claim 15, wherein the event comprises a trader-selected trigger event.

17. The method of claim 15, wherein the event comprises at least one of:
the first financial instrument attaining at least one of:
a particular market price, a particular market size, and a particular market yield;
the second financial instrument attaining at least one of:
a particular market price, a particular market size, and a particular market yield;
the first financial instrument together and the second financial instrument attaining at least one of the following with respect to one another: a particular subtractive difference in at least one of:
market price, market size, and market yield;
a particular ratio in at least one of: market price, market size, and market yield;
a particular average in at least one of: market price, market size, and market yield;
a market index attaining a particular market value;
a particular date having occurred;
a particular business transaction having closed; and
a third financial instrument having attained at least one of: a particular market price, a particular market size, and a particular market yield;
wherein the third financial instrument is different from the first financial instrument and the second financial instrument.

18. The method of claim 15, wherein controlling the submission of orders for the second financial instrument comprises:
after determining that the event has occurred, controlling, by the computing device, the submission of orders for the second financial instrument based at least in part on the linking relationship.

19. A method for facilitating electronic trading with interfaces of workstations of traders over a communication network, the method comprising:
transmitting, by a computing device, data representing a plurality of financial instruments to be displayed on a first display screen of an interface of a workstation of a trader;
receiving, by the computing device, from the interface of the workstation of the trader, data representing a selection of a first financial instrument from the plurality of financial instruments, wherein the first financial instrument is transacted in a first market;

receiving, by the computing device, from the interface of the workstation of the trader, data representing a selection of a second financial instrument from the plurality of financial instruments, wherein the second financial instrument is transacted in a second market, wherein the first financial instrument is different from the second financial instrument, and wherein the first financial instrument is to be linked to the second financial instrument;

transmitting, by the computing device, data representing a plurality of linking relationships to be displayed on a second display screen of the interface of the workstation of the trader, wherein the data representing the plurality of linking relationships represents the first financial instrument and the second financial instrument;

receiving, by the computing device, from the interface of the workstation of the trader, data representing a selection of a linking relationship between the first financial instrument and the second financial instrument;

monitoring, by the computing device, data representing bids and offers from at least one external interface of an electronic trading system, wherein the bids and offers comprise bids and offers for the first financial instrument and the second financial instrument;

ranking and sorting, by the computing device, in a queue data structure in a memory of the computing device of the electronic trading system, the data representing the bids and offers for the first financial instruments and the second financial instrument;

controlling, by the computing device, a submission of data representing orders for the second financial instrument based at least in part on the linking relationship, wherein controlling the submission of orders for the second financial instrument comprises: generating, by the computing device, a price of an order for the second financial instrument and a size of the order for the second financial instrument based at least in part on the linking relationship;

in response to determining to submit an order to an external trading system, generate electronic signals representing lock commands that are transmitted to the external trading system to cause to lock the electronic trading system for a time period to allow orders for linked instruments to be submitted without interference from external sources in response a new bid or offer;

submitting, by the computing device, data representing the order for the second financial instrument to an interface of a second electronic trading system; and limiting, by the computing device, order updates for the second financial instrument based at least in part on the linking relationship.

20. An apparatus for facilitating electronic trading with interfaces of workstations of traders over a communication network, the apparatus comprising:

a processor; and a non-transitory memory, wherein the non-transitory memory stores instructions which, when executed by the processor, direct the processor to:

transmit, by a computing device, data representing a plurality of financial instruments to be displayed on a display screen of an interface of a workstation of a trader;

receive, by a computing device, from the interface of the workstation of the trader, data representing a selection of a first financial instrument from the plurality of financial instruments, wherein the first financial instrument is transacted in a first market;

receive, by the computing device, from the interface of the workstation of the trader, data representing a selection of a second financial instrument from the plurality of financial instruments, wherein the second financial instrument is transacted in a second market of an electronic trading system, wherein the first financial instrument is different from the second financial instrument, and wherein the first financial instrument is to be linked to the second financial instrument;

transmit, by the computing device, data representing a plurality of linking relationships to be displayed on a display screen of the interface of the workstation of the trader, wherein the data representing the plurality of linking relationships represents the first financial instrument and the second financial instrument;

after transmitting the data for displaying, receive, by the computing device, from the interface of the workstation of the trader, a selection, from the plurality of linking relationships, a linking relationship between the first financial instrument and the second financial instrument;

monitor, by the computing device, data representing bids and offers from at least one external electronic trading system, wherein the bids and offers comprise bids and offers for the first financial instruments and the second financial instrument;

rank and sort, by the computing device, in a queue data structure in a memory of the computing device, the data representing the bids and offers for the first financial instruments and the second financial instrument;

in response to determining to submit an order to an external trading system, generate electronic signals representing lock commands that are transmitted to the external trading system to cause to lock the electronic trading system for a time period to allow orders for linked instruments to be submitted without interference from external sources in response a new bid or offer;

control, by the computing device, a submission of orders for the second financial instrument based at least in part on the linking relationship, wherein controlling the submission of orders for the second financial instrument comprises:

generate, by the computing device, a price of an order for the second financial instrument and a size of the order for the second financial instrument based at least in part on the linking relationship; and submit, by the computing device, the order for the second financial instrument to a second electronic trading system; and wherein controlling the submission of orders for the second financial instrument based at least in part on the linking relationship further comprises:

limit by the computing, order updates for the second financial instrument based at least in part on the linking relationship; and perform, by the computing, based at least in part on the linking relationship, at least one of the following:

adjust the price of the second financial instrument relative to a market value for the second financial instrument;

sequence the submission of orders for the second financial instrument relative to a submission of orders for the first financial instrument; and hold orders for the second financial instrument for a time period.

\* \* \* \* \*